April 10, 1962     M. H. OWENS     3,028,988
ROTARY MOWER WASHER
Filed March 29, 1960

Maxwell H. Owens
INVENTOR.

BY *Clarence A. O'Brien*
*and Harvey B. Jacobson*
Attorneys

3,028,988
ROTARY MOWER WASHER
Maxwell H. Owens, 1232 N. Broadway, Wichita, Kans.
Filed Mar. 29, 1960, Ser. No. 18,330
3 Claims. (Cl. 220—1)

This invention relates to new and useful improvements in washers particularly for power lawn mowers of the type comprising a rotary, horizontal motor driven blade operable beneath a housing, and has for its primary object to provide, in a manner as hereinafter set forth, novel means for expeditiously removing the usual accumulations of grass cuttings, dirt and other matter from said housing, blade, etc.

Another very important object of the present invention is to provide a washer of the character described comprising a water pan for the reception of the mower, said pan including a unique construction whereby the machine may be positioned therein and removed therefrom with a minimum of effort.

Other objects of the invention are to provide a rotary lawn mower washer of the aforementioned character which will be comparatively simple in construction, strong, durable, compact, of light weight and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
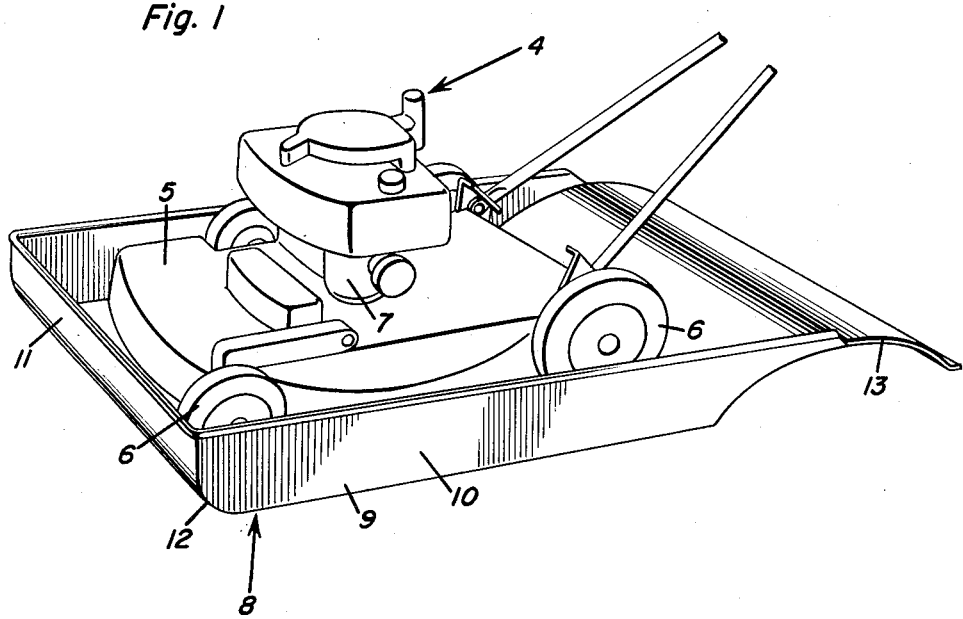
FIGURE 1 is a perspective view, showing a washer embodying the present invention with a mower in position therein.

Referring now to the drawing in detail, it will be seen that reference character 4 designates generally a conventional rotary power lawn mower. The mower 4 includes the usual housing 5 mounted on supporting wheels 6 and enclosing a rotary, horizontal cutting blade (not shown) driven by a motor 7.

The embodiment of the present invention which has been illustrated includes a generally rectangular pan of metal or other suitable material which is designated generally by reference character 8. The pan 8, which is to be filled with water to the desired level, is of dimensions to receive therein the mower 4.

The pan 8 includes a bottom 9, longitudinal side walls 10 and a front or end wall 11. At the juncture of the bottom 9 and the front wall 11, the pan 8 is rounded, as indicated at 12.

Figure 2:
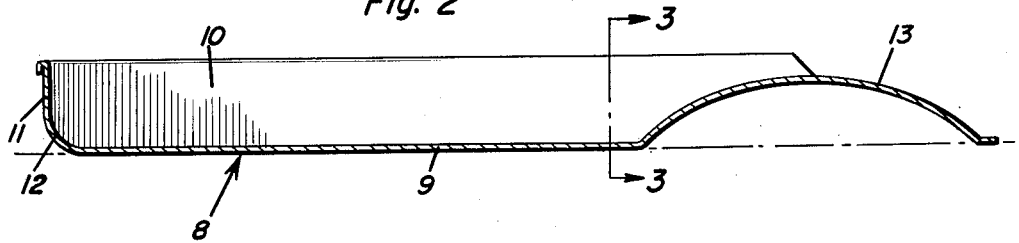
FIGURE 2 is a view in vertical longitudinal section through the device.
Figure 3:
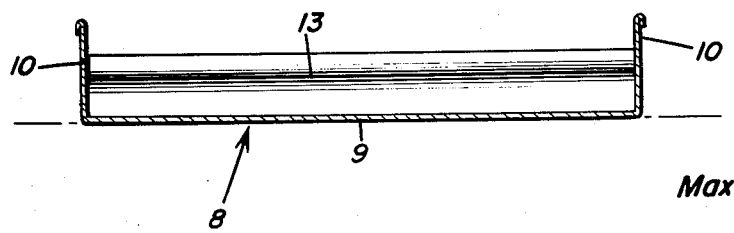
FIGURE 3 is a view in transverse section, taken substantially on the line 3—3 of FIGURE 2.

The rear end portion of the bottom 9 is formed to provide an arch 13 of a height to retain the water in the pan 8. As shown to advantage in FIGURE 2 of the drawing, the side walls 10 of the pan 8 terminate, at their rear ends, at the top portion of the arch 13.

It is thought that the use of the invention will be readily apparent from a consideration of the foregoing. Briefly, the pan 8 is placed on a suitable supporting surface and filled to the desired level with water. The mower 4 is then rolled over the arch 13 into the pan 8 where the blade of said mower is submerged in the water. The motor 7 is then started for rapidly rotating the blade in the water. Thus, the water is violently agitated in the housing 5 for rapidly removing accumulations of grass cuttings, dirt, etc., in an obvious manner. The pan 8 is of a height to intercept any water thrown from the usual discharge chute of the housing 5. When the washing operation has been completed the mower 4 is backed out of the pan 8 over the arch 13. The grass, mud and all other accumulations washed from the mower will be retained within the pan for easy disposal and cleanliness of the cleaning area.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A rotary power mower washer comprising: a flat, shallow, generally rectangular water pan for receiving the mower longitudinally therein, said pan being readily portable and including a bottom, the major portion of the bottom being flat, side walls and a front wall, said bottom comprising an arched rear end portion extending transversely between the rear end portions of the side walls and adapted to be negotiated by the mower when entering or leaving said pan, said arched rear portion including a free end portion in the horizontal plane of the bottom and adapted to rest therewith on a horizontal supporting surface.

2. A rotary power mower washer comprising: a generally rectangular, readily portable, flat shallow pan for receiving the mower longitudinally therein, said pan including a bottom, and longitudinal side walls and a front wall integral with the bottom, said bottom comprising an arched rear portion extending transversely between the rear end portions of said side walls and adapted to be negotiated by the mower when entering or leaving said pan, said arched portion including a free end in the horizontal plane of the bottom and adapted to rest therewith on a horizontal supporting surface, said pan being adapted to receive water to a depth to submerge the mower blade, said side walls being of a height to intercept water thrown from the mower by the blade.

3. A rotary power lawn mower washer comprising a generally flat, shallow, rectangular, readily portable pan of a width for snugly receiving therein a rotary mower in an upright, operative position, and further, of a depth to receive a washing fluid to a level to submerge the mower blade to be agitated and thrown upwardly thereby, said pan including an integral bottom, front and side walls, said front wall being of arcuate cross-section at its juncture with said bottom and said side walls being of a height to intercept fluid thrown by the mower blade through the discharge chute of the mower, said bottom including an upwardly bowed rear portion providing a closure between the side walls and extending rearwardly therebeyond and adapted to be negotiated by the mower when said mower is entering or leaving the pan, said bowed portion including a free end in the horizontal plane of the bottom and adapted to rest therewith on a horizontal supporting surface.

References Cited in the file of this patent
UNITED STATES PATENTS

| | | |
|---|---|---|
| 1,330,303 | Cleveland | Feb. 10, 1920 |
| 1,479,841 | Stover | Jan. 8, 1924 |
| 1,694,197 | Woodling | Dec. 4, 1928 |
| 2,620,812 | Kiefer | Dec. 9, 1952 |